(12) United States Patent
Ahn et al.

(10) Patent No.: US 10,545,537 B2
(45) Date of Patent: Jan. 28, 2020

(54) DISPLAY DEVICE AND ELECTRONIC DEVICE HAVING SAME

(71) Applicant: SAMSUNG ELECTRONICS CO., LTD., Suwon-si, Gyeonggi-do (KR)

(72) Inventors: Sung-Ho Ahn, Seoul (KR); Sung-Gwan Woo, Hwaseong-si (KR); Ki-Ju Kwak, Seoul (KR)

(73) Assignee: SAMSUNG ELECTRONICS CO., LTD., Suwon-si, Gyeonggi-do (KR)

( * ) Notice: Subject to any disclaimer, the term of this patent is extended or adjusted under 35 U.S.C. 154(b) by 0 days.

(21) Appl. No.: 15/736,862

(22) PCT Filed: Jun. 3, 2016

(86) PCT No.: PCT/KR2016/005936
§ 371 (c)(1),
(2) Date: Dec. 15, 2017

(87) PCT Pub. No.: WO2016/204439
PCT Pub. Date: Dec. 22, 2016

(65) Prior Publication Data
US 2018/0364759 A1  Dec. 20, 2018

(30) Foreign Application Priority Data

Jun. 18, 2015  (KR) .................. 10-2015-0086734
Jun. 2, 2016   (KR) .................. 10-2016-0068901

(51) Int. Cl.
*G06F 1/16*    (2006.01)
*H05K 5/00*    (2006.01)
(Continued)

(52) U.S. Cl.
CPC .............. *G06F 1/1652* (2013.01); *B32B 7/12* (2013.01); *B32B 17/064* (2013.01);
(Continued)

(58) Field of Classification Search
CPC ........ G06F 1/1652; G06F 1/1616; G06F 1/16; G06F 1/1601; G06F 1/1626
(Continued)

(56) References Cited

U.S. PATENT DOCUMENTS 9,321,679 B2 *  4/2016  Chang .................. C03C 21/002
2006/0050169 A1  3/2006  Misawa
(Continued)

FOREIGN PATENT DOCUMENTS

CN   104424851    3/2015
KR   10-0659535   12/2006
(Continued)

OTHER PUBLICATIONS

International Search Report for PCT/KR2016/005936 dated Sep. 1, 2016, 4 pages.
(Continued)

*Primary Examiner* — Anthony M Haughton
(74) *Attorney, Agent, or Firm* — Nixon & Vanderhye, P.C.

(57) ABSTRACT

Disclosed in various embodiments of the present invention are a display device and an electronic device having same, the display device comprising: a display element having at least one portion which can be changed into a curved shape; and a flexible window member stacked onto the display element, wherein the thickness of a portion of the window member is less than that of the other portions. The display device and the electronic device having same may vary according to embodiments.

14 Claims, 12 Drawing Sheets

(51) Int. Cl.
    *H05K 7/00*         (2006.01)
    *B32B 17/06*       (2006.01)
    *B32B 7/12*         (2006.01)

(52) U.S. Cl.
    CPC ........ *G06F 1/1616* (2013.01); *B32B 2255/10* (2013.01); *B32B 2457/20* (2013.01)

(58) Field of Classification Search
    USPC ............... 361/679.21–679.3, 679.55, 679.56
    See application file for complete search history.

(56) References Cited

U.S. PATENT DOCUMENTS

| | | |
|---|---|---|
| 2014/0132553 A1 | 5/2014 | Park et al. |
| 2014/0226275 A1 | 8/2014 | Ko et al. |
| 2014/0240985 A1 | 8/2014 | Kim et al. |
| 2015/0043187 A1 | 2/2015 | Lee et al. |
| 2015/0049428 A1 | 2/2015 | Lee et al. |
| 2015/0268697 A1* | 9/2015 | Nam ...................... G06F 1/1652 428/157 |
| 2015/0378397 A1* | 12/2015 | Park ...................... G06F 1/1652 361/679.27 |

FOREIGN PATENT DOCUMENTS

| | | |
|---|---|---|
| KR | 10-1156191 | 6/2012 |
| KR | 10-2014-0062269 | 5/2014 |
| KR | 10-2014-0101295 | 8/2014 |
| KR | 10-2015-0007872 | 1/2015 |
| KR | 10-2015-0017614 | 2/2015 |
| KR | 10-2016-0006585 | 1/2016 |

OTHER PUBLICATIONS

Written Opinion of the ISA for PCT/KR2016/005936 dated Sep. 1, 2016, 7 pages.

Office Action dated Nov. 5, 2019 in counterpart Chinese Patent Application No. 201680035645.6 and English-language translation.

* cited by examiner

DISPLAY DEVICE AND ELECTRONIC DEVICE HAVING SAME

TECHNICAL FIELD

The present disclosure relates to an electronic device, and particularly, to a flexible display device and an electronic device including the same.

BACKGROUND ART

An electronic device is a device that performs a specific function according to a program provided therein, such as an electronic scheduler, a portable multimedia reproducer, a mobile communication terminal, a tablet PC, an image/sound device, a desktop/laptop PC, or a vehicular navigation system, as well as a home appliance. For example, such an electronic device may output information stored therein as sound or an image. As the degree of integration of such an electronic device has increased, and super-high speed and large-capacity wireless communication has become popular, various functions have recently been provided together in a single mobile communication terminal. For example, various functions, such as an entertainment function (e.g., a game function), a multimedia function (e.g., a music/video reproduction function), a communication and security function for mobile banking, a schedule management function, and an e-wallet function, are integrated in a single electronic device, in addition to a communication function.

Electronic devices are capable of outputting information, such as an image, text, and a video image by including a display device. Display device have been developed from a vacuum tube type to a flat plate type, and it has become possible to provide a larger screen as the volumes of household appliances, such as televisions, have been drastically reduced. Further, it has also become possible to provide high-quality image information through a miniaturized electronic device, such as a mobile communication terminal.

An electronic device, such as a mobile communication terminal, may be configured to be foldable so as to ensure portability. When a flexible display device is mounted on a foldable electronic device, the portability of the electronic device can be maintained or improved while providing a larger screen in an expanded state.

Such a display device may include a display element that outputs a screen and a window member that protects the display element. The window member may have sufficient strength to protect the display element from the external environment and sufficient transparency to transmit the screen output from the display element therethrough. Further, in order to prevent deterioration of image quality due to scratches or the like of the window member, the surface hardness of the window member may be strengthened by forming a hard coating layer on the surface of the window member using a ceramic, acryl, or the like.

DETAILED DESCRIPTION OF THE INVENTION

Technical Problem

However, in a flexible display device, the window member also has flexibility, which may make it difficult to secure sufficient strength to protect the display device. For example, when a touch-screen function is incorporated in the display device, the user frequently touches the surface of the window member, and in the flexible display device, external pressure (e.g., contact pressure applied by the user) may be transferred to the display device.

It may be possible to prevent the contact pressure applied by the user from being transferred to the display element by, for example, increasing the thickness of the window member so that the mechanical strength of the window member can be increased. However, since the flexibility of the window member is deteriorated as the mechanical strength of the window member is increased, there is a limit in the extent to which the thickness of the window member in the flexible display device can be increased.

Therefore, various embodiments of the present disclosure provide a flexible display device which is capable of preventing external pressure from being transferred to a display element while ensuring the flexibility thereof, and provide an electronic device having the flexible display device.

In addition, various embodiments of the present disclosure provide a display device capable of outputting a screen of good quality while ensuring the flexibility and strength thereof, and provide an electronic device having the display device.

Technical Solution

Disclosed in various embodiments of the present disclosure are a display device and an electronic device having the same, the display device including: a display element, at least a portion of which is deformable in a curved shape; and a flexible window member stacked on the display element. A portion of the window member is formed to have a thickness smaller than the thickness of a remaining portion of the window member.

The window member may include a stepped portion or a curved portion on at least one face thereof such that a portion, in which the stepped portion or the curved portion is formed, may be formed to be thinner than a remaining portion.

In some embodiments, the display device may include:
a display element, at least a portion of which is deformable in a curved shape;
a flexible window member stacked on the display element; and
a first film member laminated on at least one face of the window member.

When the window member is mounted on an electronic device, a portion having a reduced thickness may be disposed to correspond to a portion, which is deformed into a curved shape according to, for example, an opening/closing operation of the electronic device. Through this arrangement, the deformation of the window member according to the opening/closing operation of the electronic device can be smoothly performed.

Advantageous Effects

The display device according to various embodiments of the present disclosure and the electronic device are able to secure flexibility by implementing a portion (e.g., a portion to be deformed into a curved shape) so as to have a thickness smaller than the other portions in configuring the window member that protects the display element. In configuring the display device described above, it is possible to prevent external pressure from being transferred to the display element by securing a sufficient thickness in a portion of the window member, other than the portion that is to be deformed into the curved shape. Further, in a display device according to various embodiments of the present disclosure and an electronic device having the display device, when a variation in the quality of an image, which has been transmitted through the window member due to the difference in thickness of the window member occurs, it is possible to output a screen of good quality by forming a reinforcing layer so as to compensate for the deviation in image quality.

MODE FOR CARRYING OUT THE INVENTION

Figure 1:
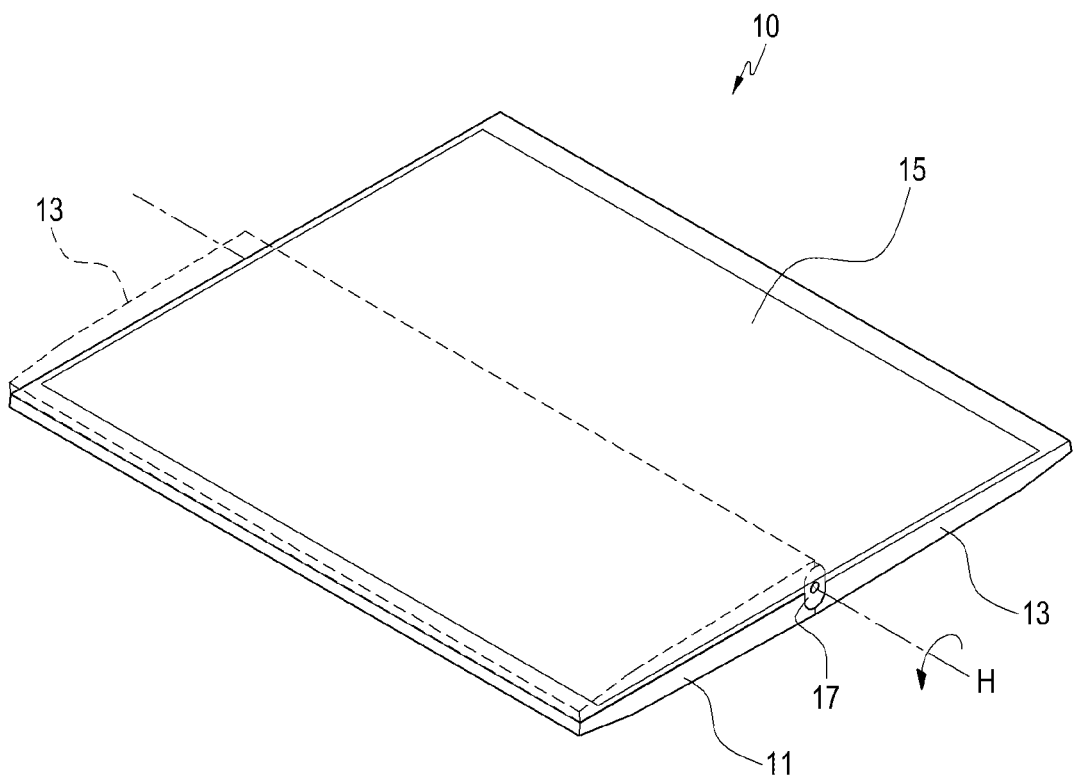
FIG. 1 is a perspective view illustrating an electronic device including a display device according to various embodiments of the present disclosure.

Hereinafter, various embodiments of the present disclosure will be described with reference to the accompanying drawings. However, it should be understood that there is no intent to limit the present disclosure to the particular forms disclosed herein; rather, the present disclosure should be construed to cover various modifications, equivalents, and/or alternatives of embodiments of the present disclosure. In describing the drawings, similar reference numerals may be used to designate similar constituent elements.

In the various embodiments of the present disclosure, the expression "A or B", "at least one of A or/and B", or "one or more of A or/and B" may include all possible combinations of the items listed. For example, the expression "A or B", "at least one of A and B", or "at least one of A or B" refers to all of (1) including at least one A, (2) including at least one B, or (3) including all of at least one A and at least one B.

The expression "a first", "a second", "the first", or "the second" used in various embodiments of the present disclosure may modify various components regardless of the order and/or the importance but does not limit the corresponding components. For example, a first user device and a second user device indicate different user devices although both of them are user devices. For example, a first element may be termed a second element, and similarly, a second element may be termed a first element without departing from the scope of the present disclosure.

It should be understood that when an element (e.g., first element) is referred to as being (operatively or communicatively) "connected," or "coupled," to another element (e.g., second element), it may be directly connected or coupled directly to the other element or any other element (e.g., third element) may be interposer between them. In contrast, it may be understood that when an element (e.g., first element) is referred to as being "directly connected," or "directly coupled" to another element (second element), there are no element (e.g., third element) interposed between them.

The expression "configured to" used in the present disclosure may be exchanged with, for example, "suitable for", "having the capacity to", "designed to", "adapted to", "made to", or "capable of" according to the situation. The term "configured to" may not necessarily imply "specifically designed to" in hardware. Alternatively, in some situations, the expression "device configured to" may mean that the device, together with other devices or components, "is able to". For example, the phrase "processor adapted (or configured) to perform A, B, and C" may mean a dedicated processor (e.g., embedded processor) only for performing the corresponding operations or a generic-purpose processor (e.g., Central Processing Unit (CPU) or Application Processor (AP)) that can perform the corresponding operations by executing one or more software programs stored in a memory device.

In the present disclosure, the terms are used to describe specific embodiments, and are not intended to limit the present disclosure. As used herein, the singular forms are intended to include the plural forms as well, unless the context clearly indicates otherwise. In the description, it should be understood that the terms "include" or "have" indicate existence of a feature, a number, a step, an operation, a structural element, parts, or a combination thereof, and do not previously exclude the existences or probability of addition of one or more another features, numeral, steps, operations, structural elements, parts, or combinations thereof.

Unless defined differently, all terms used herein, which include technical terminologies or scientific terminologies, have the same meaning as that understood by a person skilled in the art to which the present disclosure belongs. Such terms as those defined in a generally used dictionary are to be interpreted to have the meanings equal to the contextual meanings in the relevant field of art, and are not to be interpreted to have ideal or excessively formal meanings unless clearly defined in the present specification. In some cases, terms defined in this specification may not be interpreted as excluding embodiments of the present disclosure.

In the present disclosure, an electronic device may be a random device, and the electronic device may be called a terminal, a portable terminal, a mobile terminal, a communication terminal, a portable communication terminal, a portable mobile terminal, a touch screen or the like.

For example, the electronic device may be a smartphone, a portable phone, a game player, a TV, a display unit, a heads-up display unit for a vehicle, a notebook computer, a laptop computer, a tablet Personal Computer (PC), a Personal Media Player (PMP), a Personal Digital Assistants (PDA), and the like. The electronic device may be implemented as a portable communication terminal which has a wireless communication function and a pocket size. Further, the electronic device may be a flexible device or a flexible display device.

The electronic device may communicate with an external electronic device, such as a server or the like, or perform an operation through an interworking with the external electronic device. For example, the electronic device may transmit an image photographed by a camera and/or position information detected by a sensor unit to the server through a network. The network may be a mobile or cellular communication network, a Local Area Network (LAN), a Wireless Local Area Network (WLAN), a Wide Area Network (WAN), an Internet, a Small Area Network (SAN) or the like, but is not limited thereto.

Figure 2:
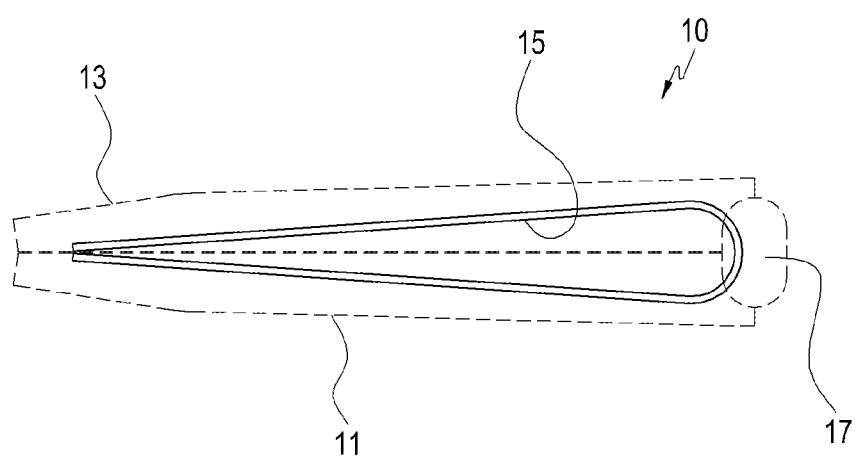
FIG. 2 is a cross-sectional view illustrating the configuration of the electronic device including the display device according to various embodiments of the present disclosure.

FIG. 1 is a perspective view illustrating an electronic device 10 that includes a display device 15 according to various embodiments of the present disclosure. FIG. 2 is a cross-sectional view illustrating the electronic device 10 that includes the display device 15 according to various embodiments of the present disclosure.

Referring to FIGS. 1 and 2, an electronic device 10 including the display device 15 according to various embodiments of the present disclosure may be a folder-type electronic device that includes a pair of housings 11 and 13, which are pivotably coupled to each other by a hinge device 17. For example, the housings 11 and 13 may be folded or unfolded with respect to each other by rotating about a hinge axis H provided by the hinge device 17. The display device 15 is a flexible display device, which is at least partially bendable. Of the housings 11 and 13, a portion of the display device 15 is arranged in and mounted on a first housing 11, and another portion of the display device 15 is arranged in and mounted on the second housing 13 of the housings 11 and 13. The display device 15 may be integrated with a touch panel so as to be used as an input device. For example, a virtual keypad may be implemented in a region of the display device 15 so that the user may conveniently input desired information even if the electronic device 10 does not have a physical keypad.

In the state in which the first and second housings 11 and 13 are folded, the display device 15 is deformed into a curved shape having a predetermined curvature at a position adjacent to the hinge device 17 so as to be bent together with the first and second housings 11 and 13. When the first and second housings 11 and 13 are rotated and unfolded with respect to each other, the display device 15 may also be unfolded in a flat plate shape so as to output a screen. Therefore, the user may easily carry the electronic device 10 by folding the first and second housings 11 and 13, and when using the electronic device 10, the first and second housings 11 and 13 may be extended, so that it is possible to confirm various pieces of information, (e.g., an image, a text, or a video image) output through the large screen. In addition, as described above, by implementing the virtual keypad through the display device 15 as required, the user may store or output desired information and the like through the electronic device 10.

As mentioned above, the display device 15 may be at least partially deformed in a curved shape. For example, when the first and second housings 11 and 13 are folded to face each other, the display device 15 may be curved in a portion adjacent to the hinge device 17. As will be described later, the display device 15 may include a window member, and the thickness of the window member may be formed smaller in a portion that is to be deformed in a curved shape than in the other portions.

Figure 3:
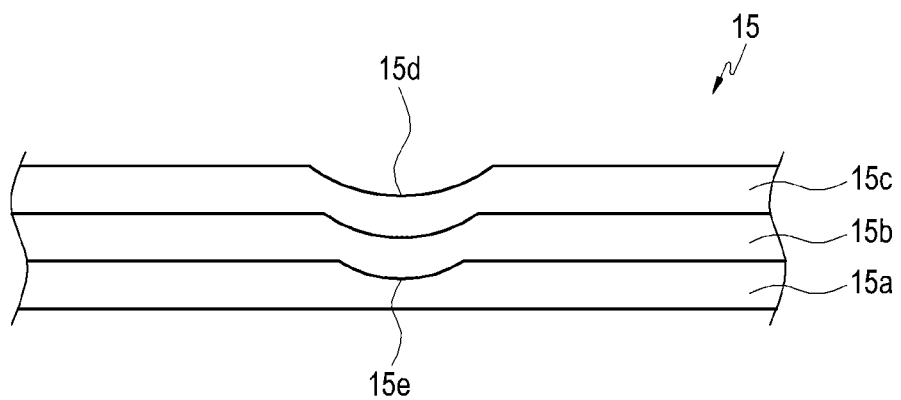
FIG. 3 is a cross-sectional view illustrating the configuration of a conventional flexible display device in the state in which external pressure is applied thereto.

FIG. 3 is a cross-sectional view illustrating the configuration of a conventional flexible display device in the state in which external pressure is applied thereto.

Referring to FIG. 3, a conventional flexible display device 15 may have a sufficiently thin thickness to be deformed in a curved shape. Therefore, the display element 15a and the window member 15c for protecting the display element 15a may have a sufficiently thin thickness. In a conventional flexible display device, the window member 15c may have a surface hardness that is resistant to damage, such as scratches, by including a cured coating layer. However, when external pressure is applied in the state in which the window member 15c is laminated and bonded to the display element 15a by an Optically Clear Adhesive (OCA) 15b, the window member 15c may be deformed in a portion 15d to which pressure is applied. The deformation of the window member 15c transfers the externally applied pressure to the display element 15a and may thus cause distortion of the screen in the portion 15e where the pressure is applied on the display element 15a, or damage to the display element 15a.

The mechanical strength of the window member 15c can be improved by increasing the thickness of the window member 15c in order to prevent the distortion of the screen or damage to the display element. However, as described above, this may also decrease the flexibility of the flexible display device.

Therefore, according to various embodiments of the present disclosure, the display device may include a window member having a structure that is capable of securing flexibility while preventing the distortion of a screen or damage to the display element due to external pressure or the like. According to various embodiments of the present disclosure, the window member of the display device may be formed to be thinner in a portion (e.g., a portion where flexibility is required) than the other portions, thereby ensuring flexibility. In the display device according to various embodiments of the present disclosure, since the thickness of the window member can be sufficiently secured in the portion where flexibility is not required, it is possible to prevent external pressure from being transferred to the display element.

Figure 4:
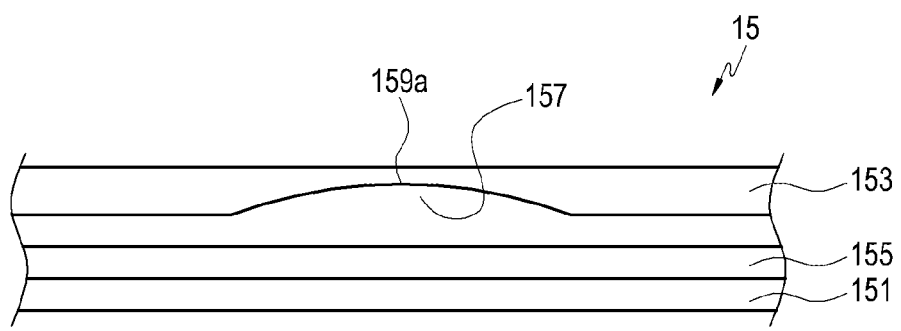
FIG. 4 is a cross-sectional view illustrating a configuration of a display device according to one of various embodiments of the present disclosure.
Figure 5:
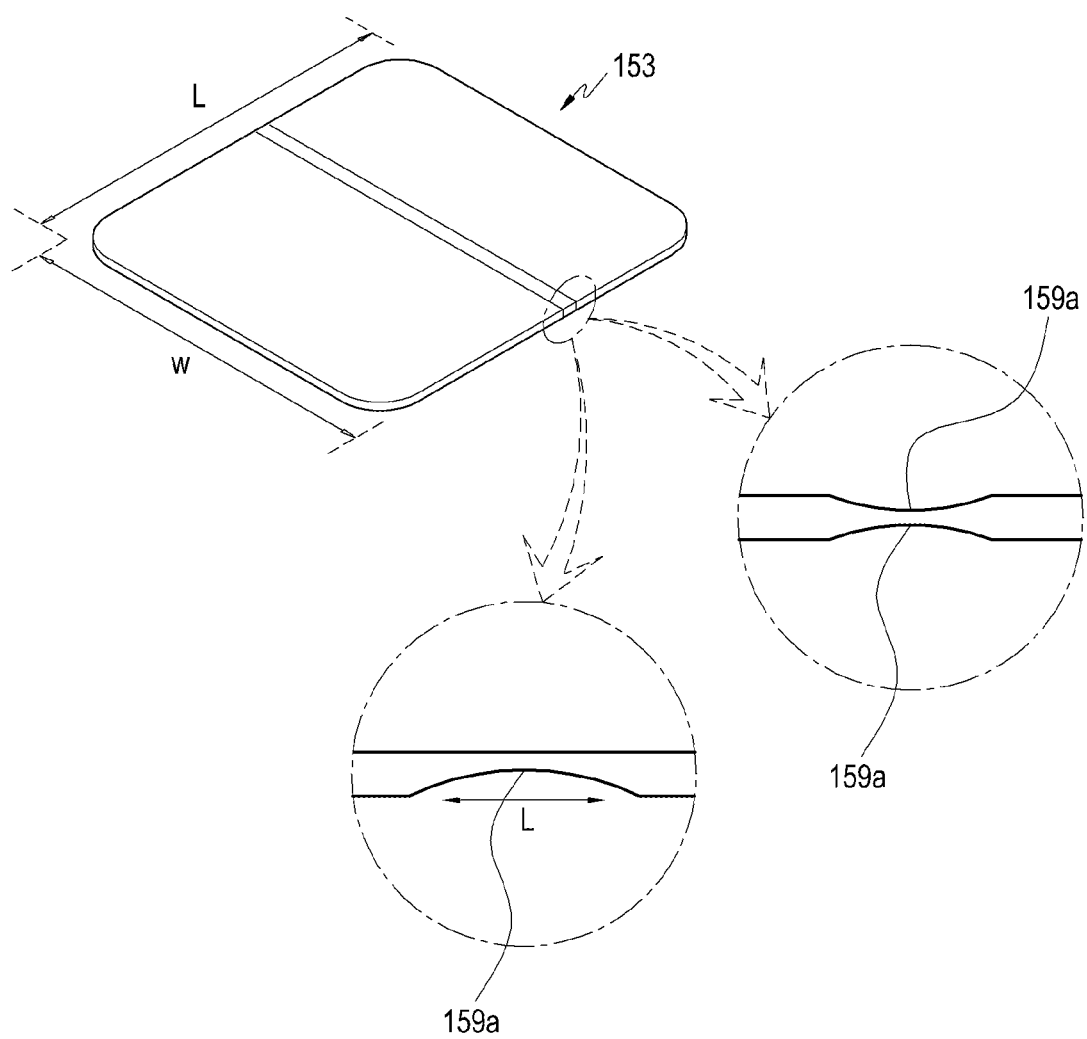
FIG. 5 is a view illustrating a window member of a display device according to one of various embodiments of the present disclosure.

FIG. 4 is a cross-sectional view illustrating the configuration of a display device 15 according to one of various embodiments of the present disclosure. FIG. 5 is a view illustrating a window member 153 of the display device 15 according to one of various embodiments of the present disclosure.

Referring to FIGS. 4 and 5, according to one of various embodiments of the present disclosure, the display device 15 includes a curved portion 159a formed in at least a portion of the window member 153, thereby forming a thickness smaller than the other portions of the window member 153, in which the curved portion 159a is not formed. As will be described below, the curved portion does not necessarily have to be formed in order to make the thickness of a portion of the window member 153 smaller than the other portions. For example, a stepped portion may be formed on one face or both faces of the window member 153 such that the thickness of a portion of the window member 153 may be thinner than the other portions. When the curved portions 159a (or the stepped portions) are formed on both faces of the window member 153, the curved portions 159a (or the stepped portions) may be symmetrically arranged.

The window member 153 may be stacked on one face of the flexible display element 151 and may be bonded to the display element 151 by an optical adhesive 155. The window member 153 and the optical adhesive 155 may each be made of a transparent material, and may transmit a screen output from the display element 151. The flexibility of the window member 153 may be increased at the portion where the curved portion 159a is formed. When the display device 151 is mounted on an electronic device (e.g., the electronic device 10), a portion (e.g., a portion thinner than the other portions) of the window member 151 may be disposed in the vicinity of the hinge device 17 described above or in a region which is bent in a curved shape, so that the portion can be deformed in a curved shape in an operation of opening/closing the electronic device 10.

The curved portion 159a may be formed on one face or on each face of the window member 153. When the curved portion 159a is formed on one face of the window member 153 and the electronic device 10 is folded, the curved portion 159a may be formed on the face, which is convexly deformed as the window member 153 is deformed in a curved shape. In addition, as described above, the curved portion 159a may be formed on each face of the window member 153. The position or the like of the curved portion 159a formed on the window member 153 may be variously set according to the specification of the electronic device, on which the display device 15 is to be mounted. The curved portion 159a may have a curved groove shape extending in the width direction W of the window member 153 and may have a shape in which the thickness of the window member 153 gradually increases while extending from the center portion toward the edges of the window member 153 in the longitudinal direction L of the window member 153.

When the display device 15 includes a touch-screen function, the curved portion 159a may correspond to a portion that accepts an input operation (e.g., a physical touch) of the user. The width of the curved portion 159a (e.g., the size of the curved portion 159a in the longitudinal direction L of the window member 153) may be smaller than an area to be touched by the user's body. Therefore, even if the window member 153 is formed thin enough to be flexible in the portion in which the curved portion 159a is formed, it is possible to prevent the pressure applied to the curved portion due to the user's body contact or the like from being transferred to the display element 151.

The window member 153 may be formed by processing a transparent synthetic resin film. In order to secure the surface hardness thereof, a cured coating layer may be formed on the outer face of the synthetic resin film for forming the window member 153. The cured coating layer may be formed by coating or depositing a material, such as ceramic or acryl, on one face (e.g., the outer face) of the synthetic resin film. Processing a portion (e.g., the curved portion 159a) of the window member 153 to have a thin thickness may be performed simultaneously with forming the synthetic resin film. For example, a synthetic resin film may be manufactured using processes, such as roller pressing, film extrusion, stamping, and cell casting, and the shape of a roller, a mold, or the like may be stamped on the above-described curved portion 159a in advance, so that the portion of the synthetic resin film can be formed thinner than the other portions simultaneously with the formation of the synthetic resin film. According to various embodiments, the synthetic resin film for forming the window member 153 may be formed to have a predetermined thickness, and the manufactured synthetic resin film may be subjected to mechanical processes (e.g., polishing, lathe processing, laser processing, etc.) so as to form the curved surface portion 159a or the like.

Depending on the size of the display device 15 or the folded shape of the electronic device 10, the width of the curved portion 159a may be formed to be larger than an area to be touched by the user's body. When the width of the curved portion 159a is formed to be large, it may be difficult to prevent the pressure applied to a portion corresponding to the curved portion 159a from being transferred to the display device 151 by the window member 153 itself. According to various embodiments, the display device 15 may further include a reinforcing layer 157, thereby securing the mechanical strength of the portion in which the curved portion 159a is formed (i.e., the portion of the window member 153 that is thinner than the other portions). For example, the reinforcing layer 157 may prevent a portion of the window member 153 that corresponds to the curved surface portion 159a, from being deformed due to a physical touch or the like.

According to various embodiments, the reinforcing layer 157 may compensate for deviation in image quality that may occur due to the variation in the thickness of the window member 153. That is, since the thickness of the window member 153 is not uniform, a quality difference may occur in an image that has been transmitted through the window member 153 due to the difference in thickness. This image quality deviation may degrade the image quality of the screen output from the display element 151. For example, there may be a difference between the screen brightness of the portion where the curved portion 159a is formed and the screen brightness of the other portions. The reinforcing layer 157 may be formed to maintain uniform optical properties of the window member 153 and uniform mechanical strength of the window member 153. The compensation layer 157 may be formed of a material having a refractive index similar to or the same as the refractive index of the window member 153.

Figure 6:
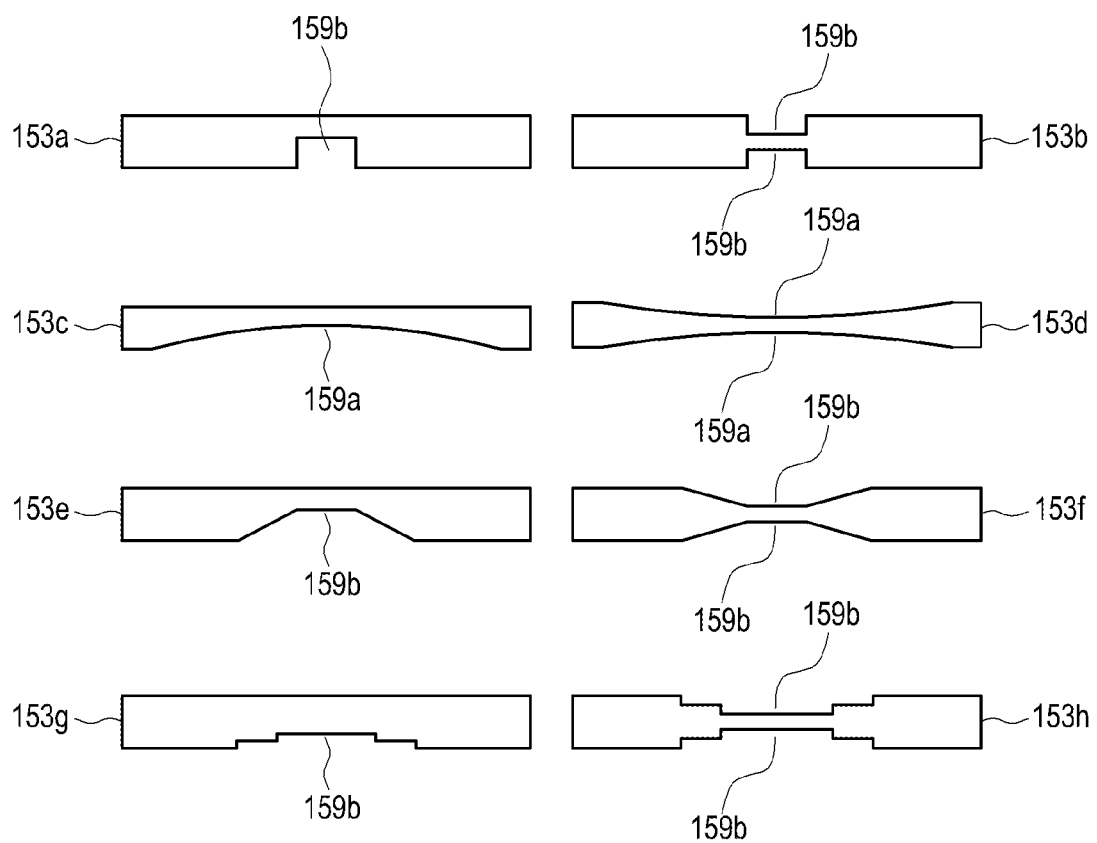
FIG. 6 is a view illustrating various modifications of the window member of the display device according to one of various embodiments of the present disclosure.

FIG. 6 is a view illustrating various modifications of the window member of the display device according to one of various embodiments of the present disclosure.

According to various embodiments of the present disclosure, a shape for reducing the thickness of a portion of the window member 153 (e.g., the curved portion 159a described above) may be formed on one face or each face of the window member 153, and may be replaced by various shapes of stepped portions 159b. In the following detailed description, the reference numerals for the window members may be given differently depending on the shape of the curved portion 159a or the stepped portion 159b, and the term "window member" denoted by reference numeral 153 may be used to mean window members each including curved portions 159a or stepped portions 159b having different shapes.

For example, the window members indicated by reference numerals 153a and 153b may include a rectangular stepped portion 159b, the window members indicated by reference numerals 153e and 153f may include a central flat portion and a stepped portion 159b having inclined portions extending toward edges in the longitudinal direction of the members 153e and 153f, and the window members indicated by the reference numerals 153g and 153h may include stepped portions 159b in a step shape, which gradually increase the thickness of the window members 153g and 153h as extending from the center toward the edges in the longitudinal direction of the window members 153g and 153h. As described above, the structure for making the thickness of the window member 153 smaller than the other portions may be formed of a curved portion 159a or a stepped portion 159b, and the shapes thereof may be variously processed.

The stepped portion 159b may have a groove shape extending in the width direction W of the window member 153 similarly to the curved portion 159a. However, in the configuration of the present disclosure, the configuration (e.g., the stepped portion 159b or the curved portion 159a) for making the thickness of the window member 153 smaller than the other portions does not necessarily have to extend in the width direction W of the window member 153. For example, when the display device 15 is mounted on the electronic device 10, the direction, number, and positions of the stepped portions 159b or the curved portions 159a formed as described above may be appropriately set and arranged in consideration of the structure, direction, etc. in which the electronic device 10 is folded.

Figure 7:
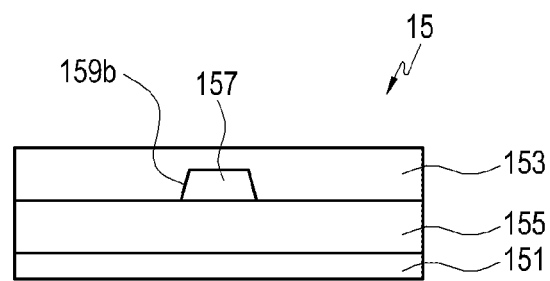
FIG. 7 is a cross-sectional view illustrating the configuration of a display device according to another one of various embodiments of the present disclosure in order to explain the display device.
Figure 8:
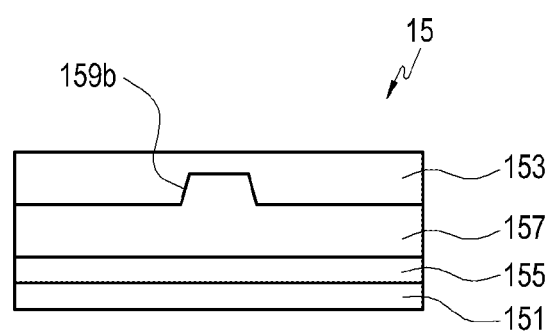
FIG. 8 is a cross-sectional view illustrating the configuration of a display device according to still another one of various embodiments of the present disclosure in order to explain the display device.

FIG. 7 is a cross-sectional view illustrating the configuration of a display device 15 according to another one of various embodiments of the present disclosure in order to explain the display device 15. FIG. 8 is a cross-sectional view illustrating the configuration of a display device 15 according to still another one of various embodiments of the present disclosure in order to explain the display device 15.

Referring to FIGS. 7 and 8, the reinforcing layer 157 described above may be formed of a transparent material, such as silicon oxide (SiOx), in the stepped portion 159b (or the curved surface portion 159a) on the window member, or on the entirety of one face (or each face) of the window member 153, which is formed with the stepped portion 159b (or the curved surface portion 159a), so as to make the portion that is formed with the stepped portion 159b, flush with the other portions on the one face (or each face) of the window member 153. The window member 153 may be bonded to the display element 151 by an optical adhesive 155 in the state in which the reinforcing layer 157 is formed. Therefore, the reinforcing layer 157 may be sealed between the window member 153 and the optical adhesive 155. The reinforcing layer 157 may reinforce the mechanical strength of the window member 153, as described above. For example, in the state in which the display device 151 is unfolded, by reinforcing the strength of a portion of the window member 153 (e.g., the portion in which the stepped portion 159b or the curved portion 159a is formed) having a smaller thickness in comparison with the other portions, it is possible to prevent external pressure applied due to the user's physical touch or the like from being transferred to the display device 151. In addition, the deviation in image quality, which may occur due to the non-uniform thickness of the window member 153, can be compensated for by forming the reinforcing layer 157.

The window member 153 of the display device described above includes the curved portion 159a (or the stepped portion) so that the window member can be easily processed in a curved shape. For example, although the window member 153 need not be flexible, the curved portion can be easily formed by forming the curved portion 159a (or the stepped portion) in the window member 153 if the window member 153 has a partially curved surface.

Figure 9:
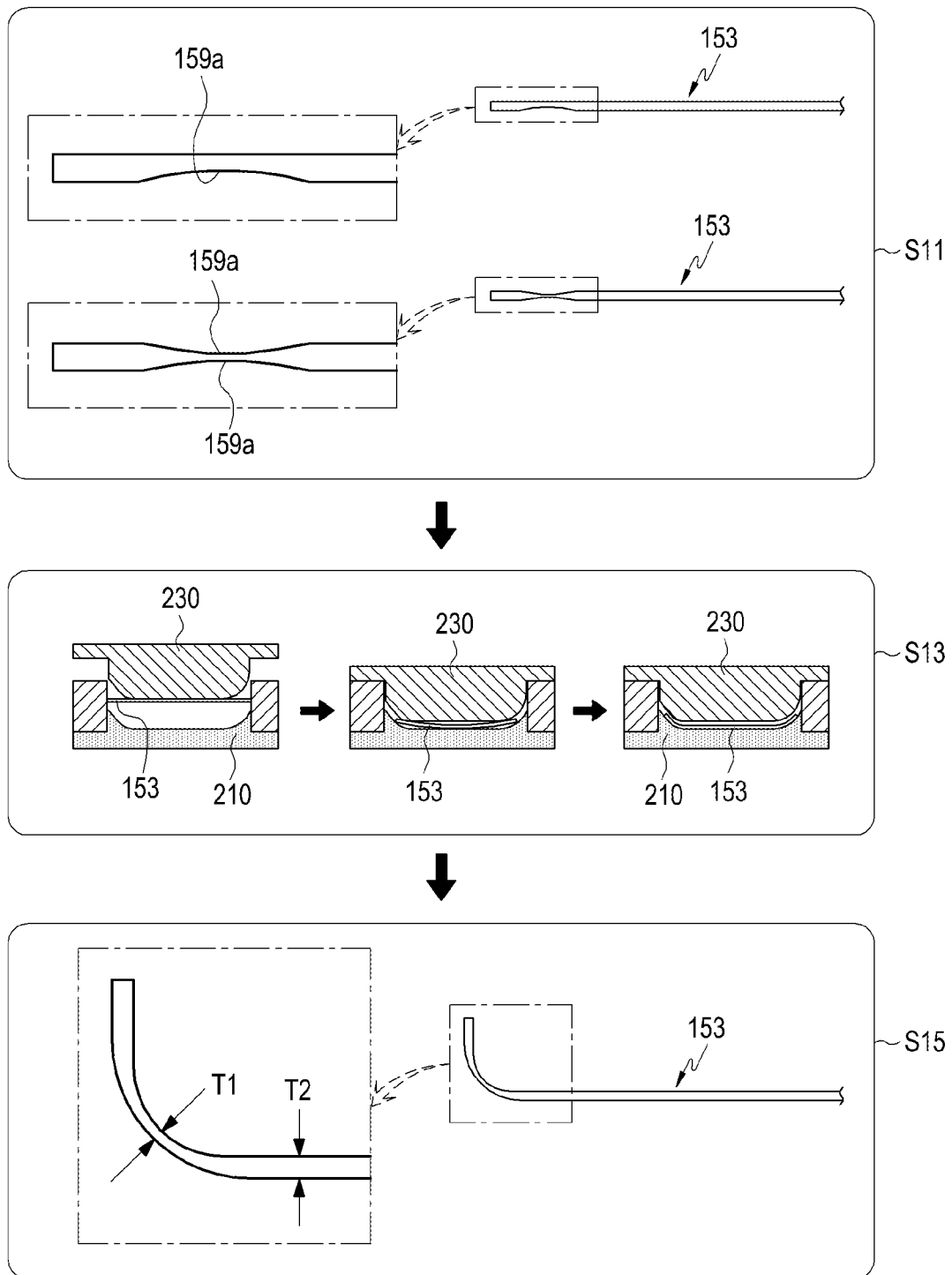
FIG. 9 illustrates views for explaining a process of manufacturing a window member of a display device according to various embodiments of the present disclosure.

FIG. 9 illustrates views for explaining a process of manufacturing a window member 153 of the display device (S10) according to various embodiments of the present disclosure.

The window member 153 may be a piece of tempered glass having a flat shape and a uniform thickness before being processed into a curved portion. A curved portion 159a (or a stepped portion) may be formed in a certain portion of the tempered glass material in the form of a flat plate (S11). The curved portion 159a (or the stepped portion) may be formed by pressing the tempered glass material by a roller having a projection on the outer surface thereof, or through processes, such as etching, polishing, lathe processing, laser processing, and the like. According to various embodiments, the curved portion may be formed simultaneously with the formation of a piece of flat tempered glass through a cell-casting process.

The window member 153, which is formed with the curved surface portion 159a on one face or each face thereof, may be processed into a partially curved shape from the flat shape by being bent at least partially through the thermoforming (S13). In the process of thermoforming (S13), the flat window member 153 may be pressed by the press 230 in the state of being mounted on the base 210, thereby being deformed to conform to the curved shape formed on the base 210. While being pressed by the press 230, heat may be applied to the flat window member 153 so as to facilitate deformation to the curved surface shape.

The curved portion 159a is provided so as to form the thickness T1 of the portion of the window member 153 to be smaller than the thickness T2 of the other portions, and when the window member 153 is processed from the flat shape into the shape having the curved shape, the portion in which the curved portion 159a is formed can be deformed. The state in which the window member 153 is processed into the curved shape is illustrated in "S15".

Figure 10:
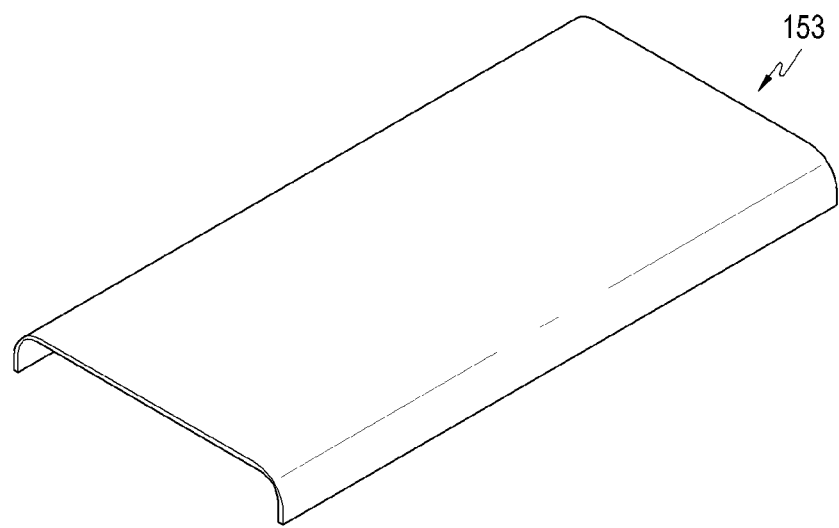
FIG. 10 is a perspective view illustrating a window member of a display device according to various embodiments of the present disclosure.
Figure 11:
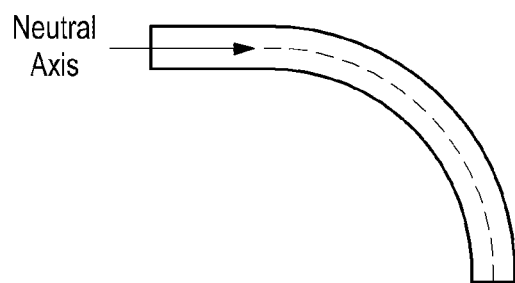
FIG. 11 is a view for explaining compressive force or tensile force formed in a curved portion of a window member.
Figure 12:
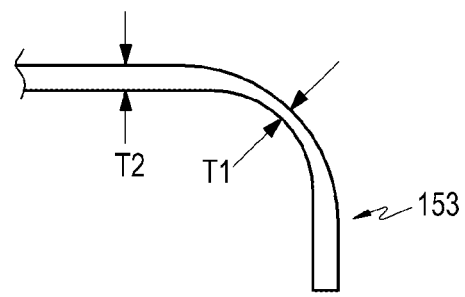
FIG. 12 is a view illustrating a curved portion of a window member of a display device according to various embodiments of the present disclosure.

FIG. 10 is a perspective view illustrating a window member 153 of a display device according to various embodiments of the present disclosure. FIG. 11 is a view for explaining compressive force or tensile force formed in a curved portion of a window member. FIG. 12 is a view illustrating a curved portion of a window member 153 of a display device according to various embodiments of the present disclosure.

Referring to FIGS. 10 and 11, in partially processing the window member 153 from a flat shape to a curved shape, locally different forces may be applied to the inner surface and the outer surface of the curved surface portion, respectively. For example, when there is no change in length even after being deformed into a curved shape along the center line of the window member (neutral axis), compressive force may be applied to the inner side of the center line (neutral axis), and tensile force may be applied on the outer side thereof. When there is no change in the length of the inner face of the window member after being deformed into a curved shape, tensile force may act on the outer face. When there is no change in the length of the outer face of the window member after being deformed into a curved shape, compressive force may act on the inner face. In this way, when the flat window member is deformed into a curved shape, deviation may occur between the force acting on the inner face and the force acting on the outer face of the deformed portion, which may lead to a molding failure of the window member. Further, as the flat window member becomes thicker, the deviation between the forces generated in the portion deformed into the curved shape may become larger. In order to prevent this, it is possible to process a flat tempered glass material into a curved window member while heating for a sufficient time in the thermoforming process.

Referring to FIG. 12, the window member 153 of the display device according to various embodiments of the present disclosure may be first formed with the curved portion 159a at a portion to be deformed into a curved shape before it is processed into the curved shape. For example, the portion to be deformed into the curved surface may be processed such that the thickness T1 thereof is made to be smaller than the thickness T2 of the other portions. As described above, in processing the flat window member 153 into a curved shape, when the thickness of the window member 153 is thick, a deviation may increase between forces generated in the deformed portion. The window member 153 of the display device according to various embodiments of the present disclosure may alleviate the defective formation of the window member 153 by reducing the deviation between the forces generated by processing the thickness of the portion deformed into the curved shape to be smaller than other portions. In addition, it is possible to reduce the time required for the thermoforming process by reducing the defects caused by the deviation between the forces.

Figure 13:
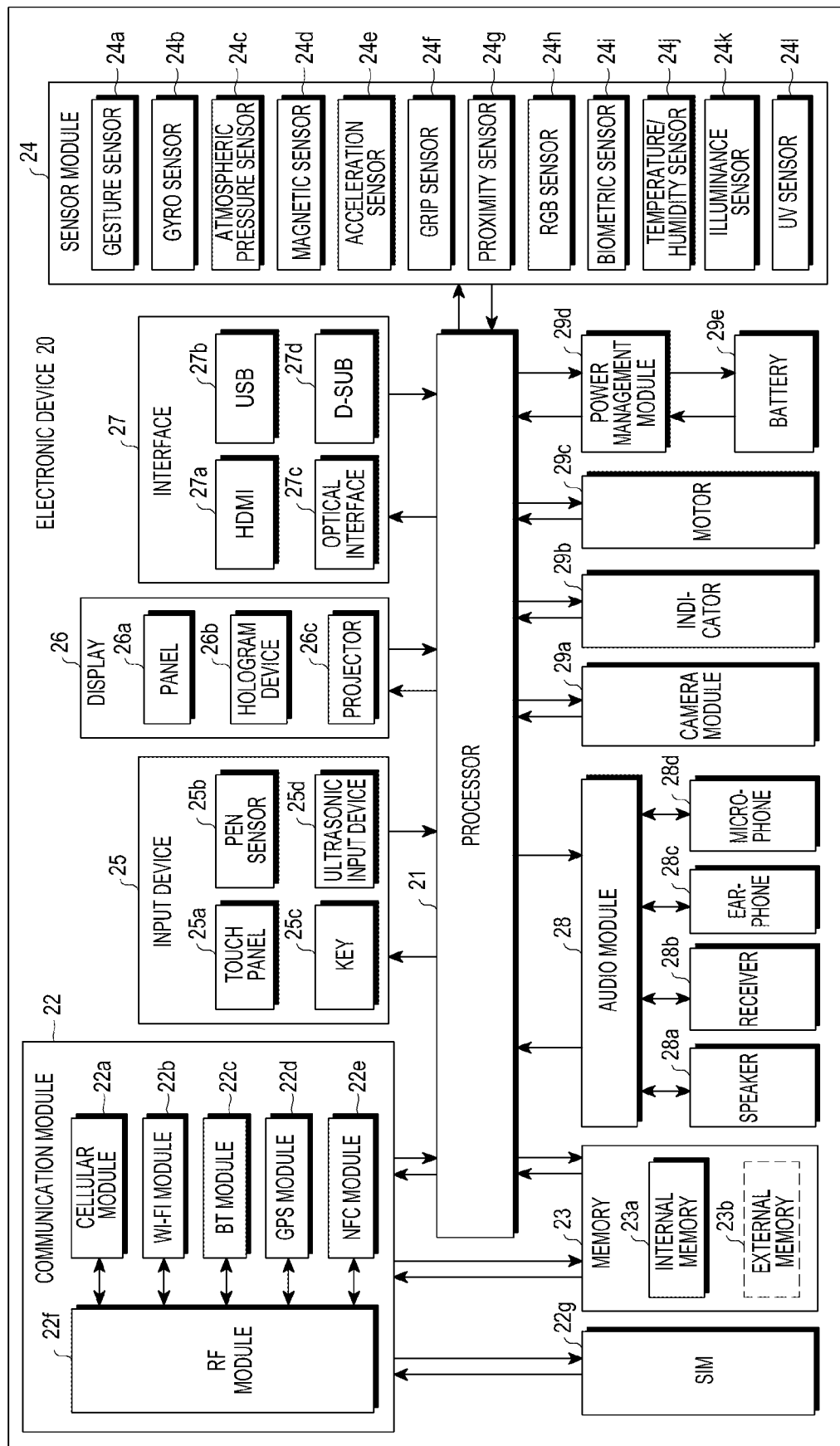
FIG. 13 is a block diagram illustrating an electronic device according to various embodiments of the present disclosure.

FIG. 13 is a block diagram illustrating an electronic device 20 according to various embodiments of the present disclosure.

Referring to FIG. 13, the electronic device 20 may include, for example, all or part of the electronic device 10 illustrated in, for example, FIG. 1. The electronic device 20 may include at least one processor (e.g., Application Processor (AP)) 21, a communication module 22, a subscriber identification module 22g, a memory 23, a sensor module 24, an input device 25, a display 26, an interface 27, an audio module 28, a camera module 29a, a power management module 29d, a battery 29e, an indicator 29b, and a motor 29c.

The processor 21 may drive, for example, an operating system or an application so as to control a plurality of hardware or software components connected thereto, and may also perform various data processing and arithmetic operations. The processor 21 may be implemented by, for example, a System-on-Chip (SoC). According to one embodiment, the processor 21 may further include a Graphic Processing Unit (GPU) and/or an image signal processor. The processor 21 may include at least some components (e.g., the cellular module 22a) among the components illustrated in FIG. 13. The processor 21 may load a command or data received from at least one of the other components (e.g., a non-volatile memory) in a volatile memory to process the command and data, and may store various data in non-volatile memory.

The communication module 22 may include, for example, a cellular module 22a, a Wi-Fi module 22b, a Bluetooth module 22c, a GNSS module 22d (e.g., a GPS module, a GLONASS module, a BeiDou module, or a Galileo module), an NFC module 22e, and a Radio Frequency (RF) module 22f.

The cellular module 22a may provide, for example, a voice call, a video call, a message service, or an internet service through, for example, a communication network. According to one embodiment, the cellular module 22a may perform discrimination and authentication of the electronic device 20 within the communication network using the subscriber identification module (e.g., a SIM card) 22g. According to one embodiment, the cellular module 22a may perform at least some of the functions that may be provided by the processor 21. According to one embodiment, the cellular module 22a may include a Communication Processor (CP).

Each of the Wi-Fi module 22b, the Bluetooth module 22c, the GNSS module 22d, and the NFC module 22e may include, for example, a processor to process data transmitted/received through a corresponding module. According to a certain embodiment, at least some (e.g., two or more) of the cellular module 22a, the Wi-Fi module 22b, the Bluetooth module 22c, the GNSS module 22d, and the NFC module 22e may be incorporated in a single Integrated Chip (IC) or an IC package.

The RF module 22f may transmit/receive, for example, a communication signal (e.g., an RF signal). The RF module 22f may include, for example, a transceiver, a Power Amp Module (PAM), a frequency filter, a Low Noise Amplifier (LNA), or an antenna. According to another embodiment, at least one of the cellular module 22a, the Wi-Fi module 22b, the Bluetooth module 22c, the GNSS module 22d, and the NFC module 22e may transmit/receive an RF signal through one or more separate RF modules.

The subscriber identification module 22g may include, for example, a card that includes a subscriber identification module and/or an embedded SIM, and may also include intrinsic identification information (e.g., an Integrated Circuit Card IDentifier (ICCID)) or subscriber information (e.g., an International Mobile Subscriber Identity (IMSI)).

The memory 23 may include, for example, an internal memory 23a or an external memory 23b. The internal memory 23a may include at least one of, for example, volatile memory (e.g., a Dynamic RAM (DRAM), a Static RAM (SRAM), or a Synchronous DRAM (SDRAM)), and non-volatile memory (e.g., a One-Time Programmable ROM (OTPROM), a Programmable ROM (PROM), an Erasable and Programmable ROM (EPROM), an Electrically Erasable and Programmable ROM (EEPROM), a mask ROM, a flash ROM, a flash memory (e.g., a NAND flash memory or a NOR flash memory), a hard drive, or a Solid-State Drive (SSD)).

The external memory 23b may further include a flash drive (e.g., Compact Flash (CF), Secure Digital (SD), Micro Secure Digital (Micro-SD), Mini Secure Digital (Mini-SD), extreme Digital (xD), Multi-Media Card (MMC), or memory stick). The external memory 23b may be functionally and/or physically connected to the electronic device 20 through any of various interfaces.

For example, the sensor module 24 may measure a physical quantity or may sense the operating status of the electronic device 20, and may then convert the measured or sensed information into electric signals. The sensor module 24 may include at least one of, for example, a gesture sensor 24a, a gyro sensor 24b, an atmospheric pressure sensor 24c, a magnetic sensor 24d, an acceleration sensor 24e, a grip sensor 24f, a proximity sensor 24g, a color sensor 24h (e.g., an RGB (Red, Green, Blue) sensor), a biometric sensor 24i, a temperature/humidity sensor 24j, an illuminance sensor 24k, and an Ultra-Violet (UV) sensor 24l. Additionally, or alternatively, the sensor module 24 may include, for example, an E-nose sensor, an ElectroMyoGraphy (EMG) sensor (not illustrated), an ElectroEncephaloGram (EEG) sensor, an ElectroCardioGram (ECG) sensor, an Infra-Red (IR) sensor, an iris sensor, and/or a fingerprint sensor. The sensor module 24 may further include a control circuit for controlling one or more sensors incorporated therein. In a certain embodiment, the electronic device 20 may further include a processor configured to control the sensor module 24 as a part of the processor 21 or separately from the processor 21 so as to control the sensor module 24 while the processor 21 is in the sleep state.

The input device 25 may include, for example, a touch panel 25a, a (digital) pen sensor 25b, a key 25c, or an ultrasonic input device 25d. As the touch panel 25a, at least one of, for example, a capacitive-type touch panel, a resistive-type touch panel, an infrared-type touch panel, and an ultrasonic-type panel may be used. In addition, the touch panel 25a may further include a control circuit. The touch panel 25a may further include a tactile layer so as to provide a tactile reaction to a user.

The (digital) pen sensor 25b may be, for example, a portion of the touch panel or may include a separate recognition sheet. The key 25c may include, for example, a physical button, an optical key, or a keypad. The ultrasonic input device 25d may sense, through a microphone (e.g., a microphone 28d), ultrasonic waves that are generated by an input tool so as to confirm data corresponding to the sensed ultrasonic waves.

The display 26 may include a panel 26a, a hologram device 26b, or a projector 26c. The panel 26a may include a configuration that is the same as or similar to that of the above-described display device 15. The panel 26a may be implemented to be flexible, transparent, or wearable. The panel 26a may be configured as a single module with the touch panel 25a. The hologram device 26b may show a stereoscopic image in the air using interference of light. The projector 26c may project light onto a screen so as to display an image. The screen may be located, for example, inside or outside the electronic device 20. According to one embodiment, the display 26 may further include a control circuit to control the panel 26a, the hologram device 26b, or the projector 26c.

The interface 27 may include, for example, a High-Definition Multimedia Interface (HDMI) 27a, a Universal Serial Bus (USB) 27b, an optical interface 27c, or a D-sub-miniature (D-sub) interface 27d. Additionally, or alternatively, the interface 27 may include, for example, a Mobile High-definition Link (MHL) interface, a Secure Digital (SD) card/Multi-Media Card (MMC) interface, or an Infrared Data Association (IrDA) standard interface.

The audio module 28 may bi-directionally convert sound and an electric signal. The audio module 28 may process sound information input or output through a speaker 28a, a receiver 28b, an earphone 28c, a microphone 28d, or the like.

The camera module 29a is a device that is capable of photographing, for example, a still image and a moving image. According to one embodiment, the camera module 29a may include one or more image sensors (e.g., a front sensor or a rear sensor), a lens, an Image Signal Processor (ISP), or a flash (e.g., LED or xenon lamp).

The power management module 29d may manage, for example, the electric power of the electronic device 20. According to one embodiment, the power management module 29d may include a Power Management Integrated Circuit (PMIC), a charger Integrated Circuit (IC), or a battery or fuel gauge. The PMIC may be configured as a wired and/or wireless charging type. The wireless charging type may include, for example, a magnetic resonance type, a magnetic induction type, or an electromagnetic wave type, and may further include an additional circuit for wireless charging (e.g., a coil loop, a resonance circuit, or a rectifier). The battery gauge may measure the remaining charge of the battery 29e, and a voltage, a current, or a temperature during charging. The battery 29e may include, for example, a rechargeable battery and/or a solar battery.

The indicator 29b may indicate a specific status of the electronic device 20 or of a part thereof (e.g., the processor 21), such as a booting status, a message status, or a charged status. The motor 29c may convert an electric signal into a mechanical vibration, and may generate, for example, a vibration or a haptic effect. Although not illustrated, the electronic device 20 may include a processor (e.g., a GPU) to support a mobile TV. The processor to support a mobile TV may process media data according to standards of, for example, Digital Multimedia Broadcasting (DMB), Digital Video Broadcasting (DVB), or MediaFlo™.

Each of the above-described component elements of hardware according to the present disclosure may be configured with one or more components, and the names of the corresponding component elements may vary based on the type of electronic device. The electronic device according to various embodiments of the present disclosure may include at least one of the aforementioned elements. Some elements may be omitted or other additional elements may be further included in the electronic device. Also, some of the hardware components according to various embodiments may be combined into one entity, which may perform functions identical to those of the relevant components before the combination.

The term "module" as used herein may, for example, mean a unit including one of hardware, software, and firmware or a combination of two or more of them. The "module" may be interchangeably used with, for example, the term "unit", "logic", "logical block", "component", or "circuit". The "module" may be a minimum unit of an integrated component element or a part thereof. The "module" may be a minimum unit for performing one or more functions or a part thereof. The "module" may be mechanically or electronically implemented. For example, the "module" according to the present disclosure may include at least one of an Application-Specific Integrated Circuit (ASIC) chip, a Field-Programmable Gate Arrays (FPGA), and a programmable-logic device for performing operations which has been known or are to be developed hereinafter.

According to various embodiments, at least some of the devices (for example, modules or functions thereof) or the method (for example, operations) according to the present disclosure may be implemented by a command stored in a computer-readable storage medium in a programming module form. When the command is executed by one or more processors, the one or more processors may perform a function corresponding to the command.

The computer readable recoding medium may include a hard disk, a floppy disk, magnetic media (e.g., a magnetic tape), optical media (e.g., a Compact Disc Read Only Memory (CD-ROM) and a Digital Versatile Disc (DVD)), magneto-optical media (e.g., a floptical disk), a hardware device (e.g., a Read Only Memory (ROM), a Random Access Memory (RAM), a flash memory), and the like. In addition, the program instructions may include high class language codes, which can be executed in a computer by using an interpreter, as well as machine codes made by a compiler. The aforementioned hardware device may be configured to operate as one or more software modules in order to perform the operation of the present disclosure, and vice versa.

Figure 14:
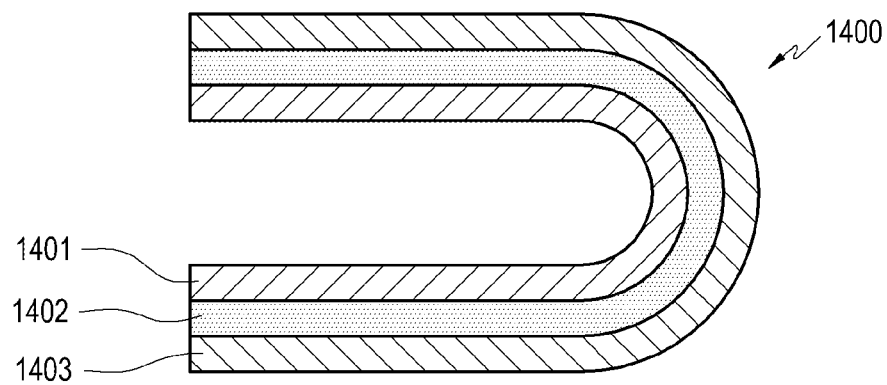
FIG. 14 is a cross-sectional view schematically illustrating the configuration of an electronic device according to one of various embodiments of the present disclosure in a folded state.
Figure 15:
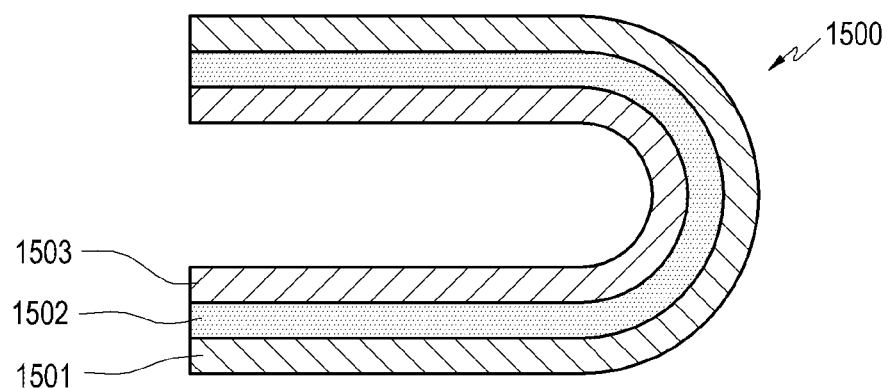
FIG. 15 is a cross-sectional view schematically illustrating the configuration of an electronic device according to another one of various embodiments of the present disclosure in a folded state.

FIG. 14 is a cross-sectional view schematically illustrating the configuration of an electronic device 1400 according to one of various embodiments of the present disclosure in a folded state. FIG. 15 is a cross-sectional view schematically illustrating the configuration of an electronic device 1500 according to another one of various embodiments of the present disclosure in a folded state.

According to various embodiments of the present disclosure, the electronic device 1400 or 1500 may be folded such that the display device (e.g., the display element 1402) can be exposed to the outside, as illustrated in FIG. 14. Likewise, the electronic device 1400 or 1500 may be folded such that the display device (e.g., display element 1502) can be concealed, as illustrated in FIG. 15. For example, according to an embodiment, the window member 1403 or 1503 may be located on the outer or inner face of the electronic device 1400 or 1500 in the state in which the electronic device 1400 or 1500 is folded. For example, as illustrated in FIG. 14, when the electronic device 1400 is folded, the window member 1403 is positioned on the outer face of the electronic device 1400 such that the screen output region of the display device 1402 can be exposed. In another embodiment, as illustrated in FIG. 15, when the electronic device 1500 is folded, the window member 1503 may be positioned on the inner face of the electronic device 1500 such that the display element 1502 can be concealed.

The display element 1402 or 1502 of the electronic device 1400 or 1500 can be protected by the cover panel 1401 or 1501 and the window member 1403 or 1503. For example, the cover panel 1401 or 1501 may be disposed to cover the display element 1402 or 1502 on one face of the display element 1402 or 1502, and the window member 1403 or 1503 may be coupled to face the other face of the display device 1402 or 1502.

According to various embodiments of the present disclosure, the above-mentioned curved portion or stepped portion does not necessarily have to be formed as long as the window member is flexibly deformed corresponding to the folding operation of the electronic device and the flat shape (or state) or the curved shape (or state) can be stably maintained even if external pressure (e.g., the user's touch input) is applied. For example, according to various embodiments of the present disclosure, the window member may be fabricated in a flat shape or a film shape having a substantially uniform thickness. For example, as will be described with reference to FIGS. 16 to 20, the first film member may be laminated on the window member, making the window member thinner so as to stably maintain the flat shape or the curved shape thereof while securing flexibility.

FIGS. 16 to 20 are cross-sectional views illustrating partial configurations of display devices according to various embodiments of the present disclosure, respectively.

Figure 16:
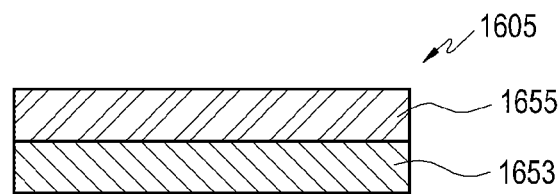
FIGS. 16 to 20 are cross-sectional views illustrating partial configurations of display devices according to various embodiments of the present disclosure, respectively.

Referring to FIG. 16, according to various embodiments of the present disclosure, a display device 1605 (e.g., the display device 15 of FIG. 4) may further include a first film member 1655 laminated on a window member 1653. The window member 1653 may include, for example, a thin glass, and may have a flat shape or a film shape with a substantially uniform thickness in the entire region thereof. According to one embodiment, the window member 1653 may be made entirely or partly of tempered glass by a chemical strengthening treatment.

According to various embodiments, the first film member 1655 may be laminated on at least one face of the window member 1653. For example, the first film member 1655 may be laminated on the outer face of the window member 1653, which is exposed to the outside, thereby protecting the window member 1653 from the external environment. According to various embodiments, the first film member 1655 may include a polyimide film or a thermoplastic polyurethane film, and in some embodiments, the first film member 1655 may include a hard coating component or an anti-fingerprint coating component. For example, the first film member 1655 may protect the window member 1653 from damage, such as scratches, or contamination, such as stains or foreign matter adhered thereto.

Figure 17:
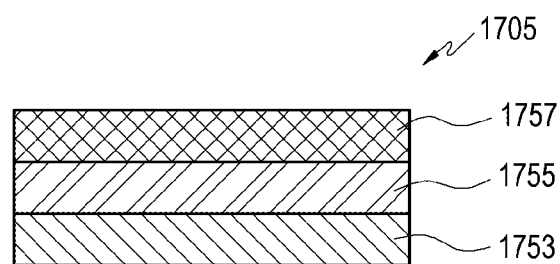

Referring to FIG. 17, according to various embodiments of the present disclosure, a display device 1705 may further include a first film member 1755 laminated to a window member 1753 and a second film member 1757 bonded to the surface of the first film member 1755. The second film member 1757 may protect the window member 1753 together with the first film member 1755, and may be formed of a polyimide film or a thermoplastic polyurethane film. In some embodiments, the second film member 1757 may prevent the window member 1753 and/or the first film member 1755 from being damaged or contaminated.

Figure 18:
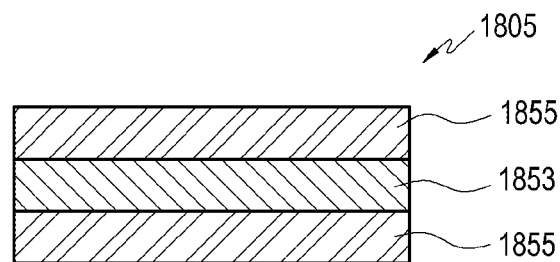

Referring to FIG. 18, according to various embodiments of the present disclosure, a display device 1805 may include first film members 1855, which are respectively laminated on both faces of a window member 1853. For example, according to various embodiments of the present disclosure, the first film member 1855 described above may be laminated on any one face of the window member 1853, or may be laminated on each face of the window member 1853. Although not illustrated, the second film member (e.g., the second film member 1757 of FIG. 17) described above may be further attached to the surface of any one of the first film members 1855.

Figure 19:
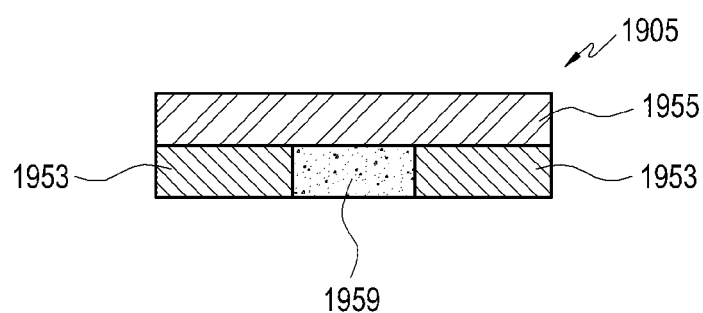

Referring to FIG. 19, according to various embodiments of the present disclosure, a display device 1905 may include a reinforcing layer 1959 forming a layer, which is the same as a window member 1953. The reinforcing layer 1959 may be disposed such that an area of the window member 1953, which is deformed in a curved shape, may be partially replaced with the reinforcing layer 1959 when the above-described electronic device (e.g., the electronic device 1400 or 1500 illustrated in FIG. 14 or FIG. 15) is folded. The reinforcing layer 1959 may improve the flexibility in, for example, a region of the layer in which the window member 1953 is disposed. In some embodiments, the reinforcing layer 1959 is able to compensate for a difference in image quality between a portion of the region, in which the window member 1953 is not disposed and a region in which the window member 1953 is disposed. The display device 1905 may further include a first film member 1955 laminated on one face of the window member 1953 and/or one face of the reinforcing layer 1959. The first film member 1955 is able to prevent the window member 1953 and/or the reinforcing layer 1959 from being damaged or contaminated. Although not illustrated, the above-described second film member (e.g., the second film member 1757 of FIG. 17) may be further attached to the surface of the first film member 1955.

Figure 20:
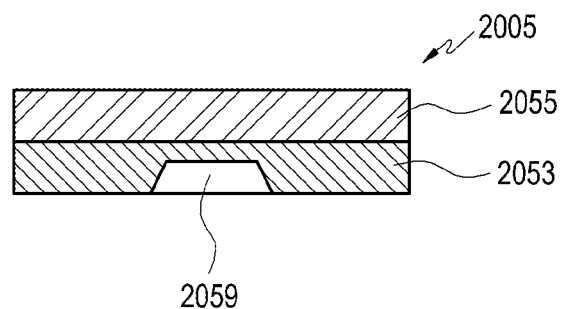

Referring to FIG. 20, according to various embodiments of the present disclosure, a display device 2005 may include a curved portion and/or a stepped portion (e.g., the curved portion 159a of FIG. 4) formed on one face (or each face) of a window member 2053, and a curved portion, which is formed on one face of the window member 2053, may be filled with a transparent synthetic resin, an optical adhesive, or the like, thereby forming a reinforcing layer 2059.

According to various embodiments, the display device 2005 may further include a first film member 2055, which is laminated on one face of the window member 2053, which is formed with the reinforcing layer 2059, and/or the other face of the window member 2053. The first film member 2055 is able to prevent the window member 2053 and/or the reinforcing layer 2059 from being damaged or contaminated. Although not illustrated, the above-described second film member (e.g., the second film member 1757 of FIG. 17) may be further attached to the surface of the first film member 2055.

As described above, according to various embodiments of the present disclosure, a display device may include: a display element, at least a portion of which is deformable in a curved shape; and a flexible window member stacked on the display element. A portion of the window member may be formed to have a thickness smaller than the thickness of a remaining portion of the window member.

According to various embodiments, the display device may further include a reinforcing layer stacked on one face of the window member. The reinforcing layer may compensate for a variation in the quality of an image transmitted through the window member, the variation being caused by the difference in the thickness of the window member.

According to various embodiments, in at least one face of the window member, a portion of the window member may include a stepped portion or a curved portion such that the portion of the window member has a thickness smaller than the thickness of a remaining portion of the window member.

According to various embodiments, the stepped portion may have a groove shape that extends in the width direction of the window member.

According to various embodiments, the stepped portion may have a step shape, which gradually increases the thickness of the window member from a center thereof toward an edge thereof in the longitudinal direction of the window member.

According to various embodiments, the stepped portion may include a central flat portion and an inclined portion extending toward the edge in the longitudinal direction of the window member.

According to various embodiments, the stepped portion may have a groove shape, which extends in the width direction of the window member and gradually increases the thickness of the window member from the center toward the edge in the longitudinal direction of the window member.

According to various embodiments, the stepped portion or the curved portion may be formed on each face of the window member.

According to various embodiments, the stepped portion or the curved portion may be formed on a face, which becomes convex when the window member is deformed in a curved shape.

According to various embodiments, the above-described display device may further include a reinforcing layer formed in at least the stepped portion or the curved portion on the window member. The reinforcing layer may compensate for a variation in the quality of image transmitted through the window member, the variation being caused by a difference in the thickness of the window member.

According to various embodiments, the reinforcing layer may be formed in an entirety of at least one face of the window member, in which the stepped portion or the curved portion is formed.

According to various embodiments of the present disclosure, a display device may include:

a display element, at least a portion of which is deformable in a curved shape;

a flexible window member stacked on the display element; and a first film member laminated on at least one face of the window member.

According to various embodiments, the first film member may include a polyimide film or a thermoplastic polyurethane film.

According to various embodiments, the first film member may contain a cured coating component or an anti-fingerprint coating component.

According to various embodiments, the display device may further include a second film member bonded to a surface of the first member.

According to various embodiments, a portion of the window member may be formed to have a thickness smaller than the thickness of a remaining portion of the window member.

An electronic device according to various embodiments of the present disclosure may include the display device described above.

According to various embodiments, the electronic device may further include: a first housing; a second housing that pivots in a direction of being folded or unfolded with respect to the first housing; and a hinge device, which pivotably couples the second housing to the first housing. A portion of the display device may be mounted on the first housing and a remaining portion of the display device may be mounted on the second housing so as to be folded or unfolded with respect to the second housing.

According to various embodiments, the display device may be formed such that a portion of the display device adjacent to the hinge device has a thickness smaller than the thickness of a remaining portion of the display device.

According to various embodiments, the display device may be deformed into a curved shape in a portion adjacent to the hinge device when the second housing is folded to the first housing.

While the present disclosure has been shown and described with reference to certain embodiments thereof, it will be understood by those skilled in the art that various changes in form and details may be made therein without departing from the spirit and scope of the present disclosure as defined by the appended claims.

The invention claimed is:

1. A display device capable of folding/unfolding according to a user operation, the display device comprising:

a display panel configured to be folded at a folding area according to the user operation; and a flexible window member comprising glass and stacked on the display panel, wherein the window member includes a trapezoid stepped portion, formed on a rear face of the window member, corresponding to the folding area such that the window member has a first thickness in the trapezoid stepped portion and a second thickness greater than the first thickness in portions of the window member other than in the trapezoid stepped portion, wherein the trapezoid stepped portion formed on the rear face of the window member is fully filled with a transparent synthetic resin or an optical adhesive to provide mechanical strength and compensation for deviation in optical quality that may occur due to variation in thickness of the window member.

2. The display device of claim 1, wherein the trapezoid stepped portion formed on the rear face of the window member is configured to become convex when the window member is folded.

3. The display device of claim 1, wherein the transparent synthetic resin or the optical adhesive is further formed on an entirety of the rear face of the window member.

4. The display device of claim 3, further comprising:
a first film member laminated on a front face of the window member, the first film member comprising a polyimide film or a thermoplastic polyurethane film, and the first film member including a hard coating layer or an anti-fingerprint coating layer.

5. The display device of claim 1, further comprising:
a first film member laminated on a front face of the window member, the first film member including a polyimide film or a thermoplastic polyurethane film, and the first film member including a hard coating layer or an anti-fingerprint coating layer.

6. The display device of claim 4, further comprising a second film member bonded to a surface of the first film member.

7. An electronic device capable of folding/unfolding according to a user operation, the electronic device comprising:
a first housing;
a second housing that pivots in a direction of being folded or unfolded with respect to the first housing;
a hinge device, which pivotably couples the second housing to the first housing;
a display panel configured to be folded at a folding area according to the user operation, a portion of the display panel being mounted on the first housing and another portion of the display panel being mounted on the second housing so as to be folded or unfolded according to the user operation; and
a flexible window member comprising glass and stacked on the display panel,
wherein the window member includes a trapezoid stepped portion, formed on a rear face of the window member, corresponding to the folding area such that the window member has a first thickness in the trapezoid stepped portion and second thickness greater than the first thickness in an area other than the trapezoid stepped portion,
wherein the trapezoid stepped portion formed on the rear face of the window member is fully filled with a transparent synthetic resin or an optical adhesive to provide mechanical strength and compensation for deviation in optical quality that may occur due to variation in thickness of the window member.

8. The electronic device of claim 7, wherein the trapezoid stepped portion of the window member is disposed adjacent to the hinge device.

9. The electronic device of claim 7, wherein the display panel is deformed into a curved shape in a portion adjacent to the hinge device when the second housing is folded to the first housing.

10. The electronic device of claim 7, wherein the trapezoid stepped portion is formed on both faces of the window member and are symmetrically arranged with respect to each other.

11. The electronic device of claim 7, wherein the transparent synthetic resin or the optical adhesive is further formed on an entirety of the rear face of the window member.

12. The electronic device of claim 7, further comprising:
a first film member laminated on a front face of the window member, the first film member comprising a polyimide film or a thermoplastic polyurethane film, and the first film member including a hard coating layer or an anti-fingerprint coating layer.

13. The electronic device of claim 7, wherein the trapezoid stepped portion formed on the rear face of the window member is configured to become convex when the window member is folded.

14. The electronic device of claim 7, further comprising a second film member bonded to a surface of the first film member.

* * * * *